United States Patent
Bleckert et al.

(10) Patent No.: US 9,301,109 B2
(45) Date of Patent: Mar. 29, 2016

(54) METHOD AND APPARATUSES FOR SENDING MESSAGE TO A MOBILE STATION BY ADDRESSING A HARDWARE PART

(75) Inventors: Peter Bleckert, Uppsala (SE); Robert Skog, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1533 days.

(21) Appl. No.: 10/586,618

(22) PCT Filed: Mar. 26, 2004

(86) PCT No.: PCT/SE2004/000481
§ 371 (c)(1),
(2), (4) Date: Jul. 19, 2006

(87) PCT Pub. No.: WO2005/094097
PCT Pub. Date: Oct. 6, 2005

(65) Prior Publication Data
US 2009/0017817 A1      Jan. 15, 2009

(51) Int. Cl.
*H04W 4/00*    (2009.01)
*H04W 4/14*    (2009.01)
*H04W 8/26*    (2009.01)
*H04W 64/00*   (2009.01)

(52) U.S. Cl.
CPC . *H04W 4/14* (2013.01); *H04W 8/26* (2013.01); *H04W 64/00* (2013.01)

(58) Field of Classification Search
CPC .......... H04W 4/14; H04W 64/00; H04W 8/26
USPC .......... 455/433, 466, 566; 370/312, 313, 328
See application file for complete search history.

(56) References Cited

U.S. PATENT DOCUMENTS

| | | | |
|---|---|---|---|
| 6,366,777 B1 | 4/2002 | Uusitalo | |
| 6,993,320 B1 * | 1/2006 | Brune et al. | 455/406 |
| 7,526,298 B2 * | 4/2009 | Klockner | 455/466 |
| 2002/0037712 A1 | 3/2002 | Shin | |
| 2002/0159387 A1 | 10/2002 | Allison et al. | |
| 2003/0126435 A1 * | 7/2003 | Mizell et al. | 713/168 |
| 2003/0174689 A1 | 9/2003 | Fujino | |
| 2004/0180676 A1 * | 9/2004 | Haumont et al. | 455/461 |
| 2004/0259531 A1 * | 12/2004 | Wood et al. | 455/412.1 |
| 2005/0108417 A1 * | 5/2005 | Haumont | 709/232 |

FOREIGN PATENT DOCUMENTS

| | | |
|---|---|---|
| EP | 1 343 346 | 9/2003 |
| JP | 10-023068 | 1/1998 |
| JP | 10023068 | 1/1998 |
| JP | 11-088433 | 3/1999 |
| JP | 2002-084305 | 3/2002 |
| JP | 2002-152814 | 5/2002 |
| JP | A 2003-259422 | 9/2003 |
| WO | 99/55107 | 10/1999 |

OTHER PUBLICATIONS

WO/2004004382.*
International Search Report for PCT/SE2004/000481 dated Nov. 2, 2004.
European official action Dec. 5, 2008, in corresponding European Application No. 04 723 890.2-2412.
Summary of Japanese official action, Aug. 10, 2009, in corresponding Japanese Application No. 2007-504908.
Summary of Japanese official action, Dec. 14, 2009, in corresponding Japanese Application No. 2007-504908.
Summary of the Japanese official action and Japanese official action, dated May 31, 2010 in corresponding Japanese Application No. 2007-504908.

* cited by examiner

Primary Examiner — Ajit Patel

(57) ABSTRACT

A message, e.g., a SMS message, intended for a specific hardware item is provided from an application node to a message controller together with hardware identification data, e.g., IMSI or IMEISV. The message controller and a location updated subscriber database, e.g., an HLR, having stored information about the intended terminating hardware, interact and a further handling of the message is decided based on the provided hardware identification data and on data stored in the location updated subscriber database.

16 Claims, 7 Drawing Sheets

|   101    |   102  |   103    |   104     |
|----------|--------|----------|-----------|
| MSISDN   | IMSI   | IMEISV   | MSC-ADDR  |
| MSISDN-0 | IMSI-0 | IMEISV-0 | MSC-0     |
| MSISDN-1 | IMSI-1 | IMEISV-1 | MSC-1     |
| MSISDN-6 | IMSI-6 | IMEISV-6 | MSC-1     |
| MSISDN-3 | IMSI-3 | IMEISV-3 | MSC-0     |
| MSISDN-4 | IMSI-4 | IMEISV-4 | MSC-2     |
| MSISDN-5 | IMSI-5 | IMEISV-5 | MSC-0     |
| ⋮        | ⋮      | ⋮        | ⋮         |

Fig. 2a     50

|   101       |   102  |   103    |   104     |
|-------------|--------|----------|-----------|
| MSISDN      | IMSI   | IMEISV   | MSC-ADDR  |
| MSISDN-0    | IMSI-0 | IMEISV-0 | MSC-0     |
| MSISDN-1    | IMSI-1 | IMEISV-1 | MSC-1     |
| (MSISDN-1)  | IMSI-2 | IMEISV-2 | MSC-2     |
| (MSISDN-3)  | IMSI-3 | IMEISV-3 | MSC-0     |
| MSISDN-3    | IMSI-4 | IMEISV-4 | MSC-2     |
| MSISDN-5    | IMSI-5 | IMEISV-5 | MSC-0     |
| ⋮           | ⋮      | ⋮        | ⋮         |

Fig. 2b     50

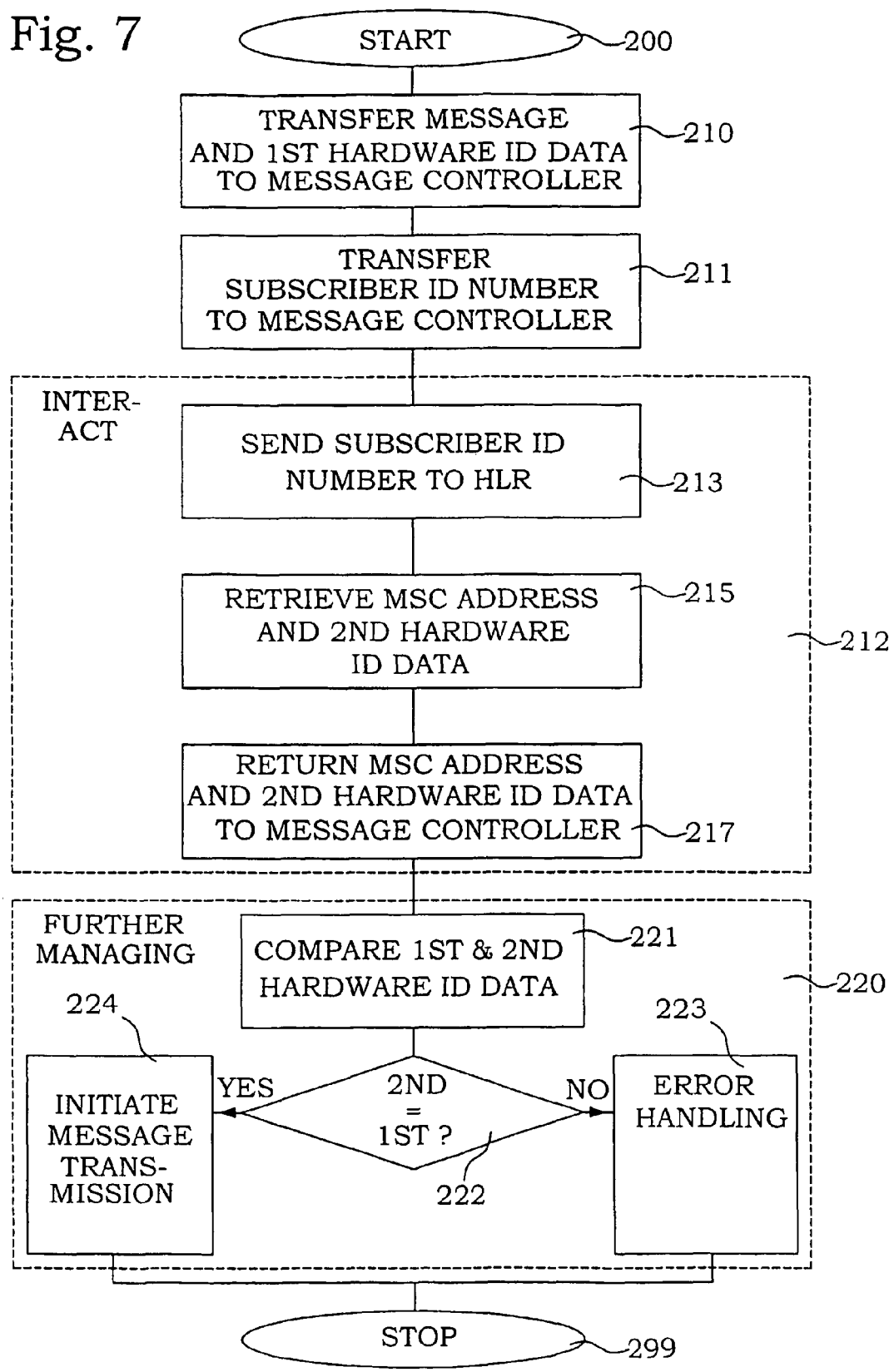

ized addressing information, since the SMS content is intended for a particular user. The SMS message and the MSISDN are provided to a SMS controller, which temporary stores the SMS and searches for the intended terminating mobile subscriber. In searching for the terminating mobile subscriber, the SMS controller interacts with a Home Location Register (HLR) for achieving identity data, International Mobile Subscriber Identity (IMSI), of a Subscriber Identity Module (SIM) associated with the terminating mobile subscriber. The HLR also provides an address of a Mobile Switching Centre (MSC) through which the SIM can be reached. By using this data, the message can be routed to the appropriate terminating mobile subscriber.

METHOD AND APPARATUSES FOR SENDING MESSAGE TO A MOBILE STATION BY ADDRESSING A HARDWARE PART

This application is the US national phase of international application PCT/SE2004/000481 filed 26 Mar. 2004, which designated the U.S., the entire content of which is hereby incorporated by reference.

The technology described herein relates in general to handling of messages, particularly short message service (SMS) messages in mobile communications networks, and in particular to finding the appropriate terminating address of a SMS message.

BACKGROUND

Short Message Service (SMS) has been used in mobile communications networks to enable different subscribers to send short text messages to each other. The Mobile Subscriber ISDN Number (MSISDN), i.e. the phone number of the mobile subscriber is utilised as the identifying addressing information, since the SMS content is intended for a particular user. The SMS message and the MSISDN are provided to a SMS controller, which temporary stores the SMS and searches for the intended terminating mobile subscriber. In searching for the terminating mobile subscriber, the SMS controller interacts with a Home Location Register (HLR) for achieving identity data, International Mobile Subscriber Identity (IMSI), of a Subscriber Identity Module (SIM) associated with the terminating mobile subscriber. The HLR also provides an address of a Mobile Switching Centre (MSC) through which the SIM can be reached. By using this data, the message can be routed to the appropriate terminating mobile subscriber.

The SMS concept is today also used for several network-based applications, in which SMS is used to push data directly to a client in the phone. Examples of this are Over-The-Air (OTA) SMS, Multimedia Message Service (MMS) notifications and SIM Toolkit updates. In order to fit into the basic SMS concept, also those applications are using MSISDN as the address for reaching either the SIM card or the mobile terminal.

As long as there is a one-to-one correspondence between the MSISDN, the IMSI and the identity of the mobile terminal, e.g. defined by the International Mobile Equipment Identity (IMEI) or the IMEI extended with the software version (IMEISV), either of these quantities can be used for addressing purposes, giving the same terminating terminal, SIM and subscriber. However, by introducing more flexible solutions allowing e.g. a subscriber to move the SIM card between different terminals, or allowing a single mobile subscriber to have more than one SIM card addressed with the same MSISDN, addressing problems may arise.

A part of the work within 3GPP is directed to standardise a function to automatically detect when a SIM card identified by IMSI is used in a terminal identified by IMEISV for the first time. This function is named Automatically Device Detection (ADD). The information comprising at least MSISDN, IMSI and IMEISV is stored in a terminal capability server. The terminal capability server also has the capability to forward the relevant information to external applications, such as Device Management Systems (DMS). Those applications can use part of the information as triggers to different events. Examples are that SMS with new GPRS settings can be sent out to terminals that require those settings before they can be used for MMS, Wireless Application Protocol (WAP) or other data services. The terminal capability server thereby allows connected applications to solve the problems of moving the SIM card to different terminals. However, the problems remain for applications not connected to any updated terminal database and for the use of dual SIM cards.

SUMMARY

A general problem with prior art SMS systems is that there is an indefiniteness in addressing hardware parts, e.g. SIM cards or mobile terminals, of a mobile subscriber in a mobile communications network. A further problem with prior-art solutions is that the simultaneous use of more than one SIM card for the same mobile subscriber makes it impossible to ensure that an SMS message reaches the intended hardware.

A general object is therefore to provide methods, devices and systems in which also hardware associated identifications can be used as addressing data when sending messages. A further object is to provide such methods, devices and systems that require only small changes in present standardised systems.

The objects mentioned above are achieved by methods, devices and systems according to the enclosed patent claims. A message, e.g., a SMS message, intended for a specific hardware item is provided from an application node to a message controller together with hardware identification data, e.g., IMSI or IMEISV, specifying the intended terminating hardware. The message controller and a location updated subscriber database, e.g., an HLR, having stored information about the intended terminating hardware, interact. Further handling of the message is decided based on the provided hardware identification data and on data stored in the location updated subscriber database. Preferably, the further handling is based on a comparison between hardware identification data stored in the location updated subscriber database and the provided hardware identification data. In one embodiment, the hardware identification data is provided to the location updated subscriber database, in which a comparison is made with the stored data, resulting in the retrieval of IMSI and a relevant switching or support node address of the hardware. In another embodiment, the application node also provides the subscriber identity, e.g. the MSISDN, to the message controller. The message controller interacts with the location updated subscriber database to achieve hardware identification data (e.g IMSI and/or IMEISV) from the location updated subscriber database. If the hardware identification data provided by the application node, at a comparison made at the message controller, corresponds to the hardware data achieved from the location updated subscriber database, the message is transmitted to the switching or support node address also achieved from the location updated subscriber database. Otherwise error functionalities are applied.

An advantage with the technology described herein is that any indefiniteness in addressing hardware intended as terminating items of a message is removed. Another advantage is that only a limited amount of change in present standards has to be performed.

BRIEF DESCRIPTION OF THE DRAWINGS

FIGS. 2A and 2B are schematic illustrations of stored data of typical HLR units;

FIG. 7 is a flow diagram of the main steps of another example embodiment of a method.

DETAILED DESCRIPTION

In the present disclosure, the term "hardware identification data" comprises identification data associated with all kinds of hardware, including e.g. SIM cards, mobile terminals etc. Hardware identification data may thus comprise e.g. IMSI, IMEI, IMEISV as well as combinations thereof.

A short overview of a prior communications system supporting SMS is illustrated and described.

Figure 1:
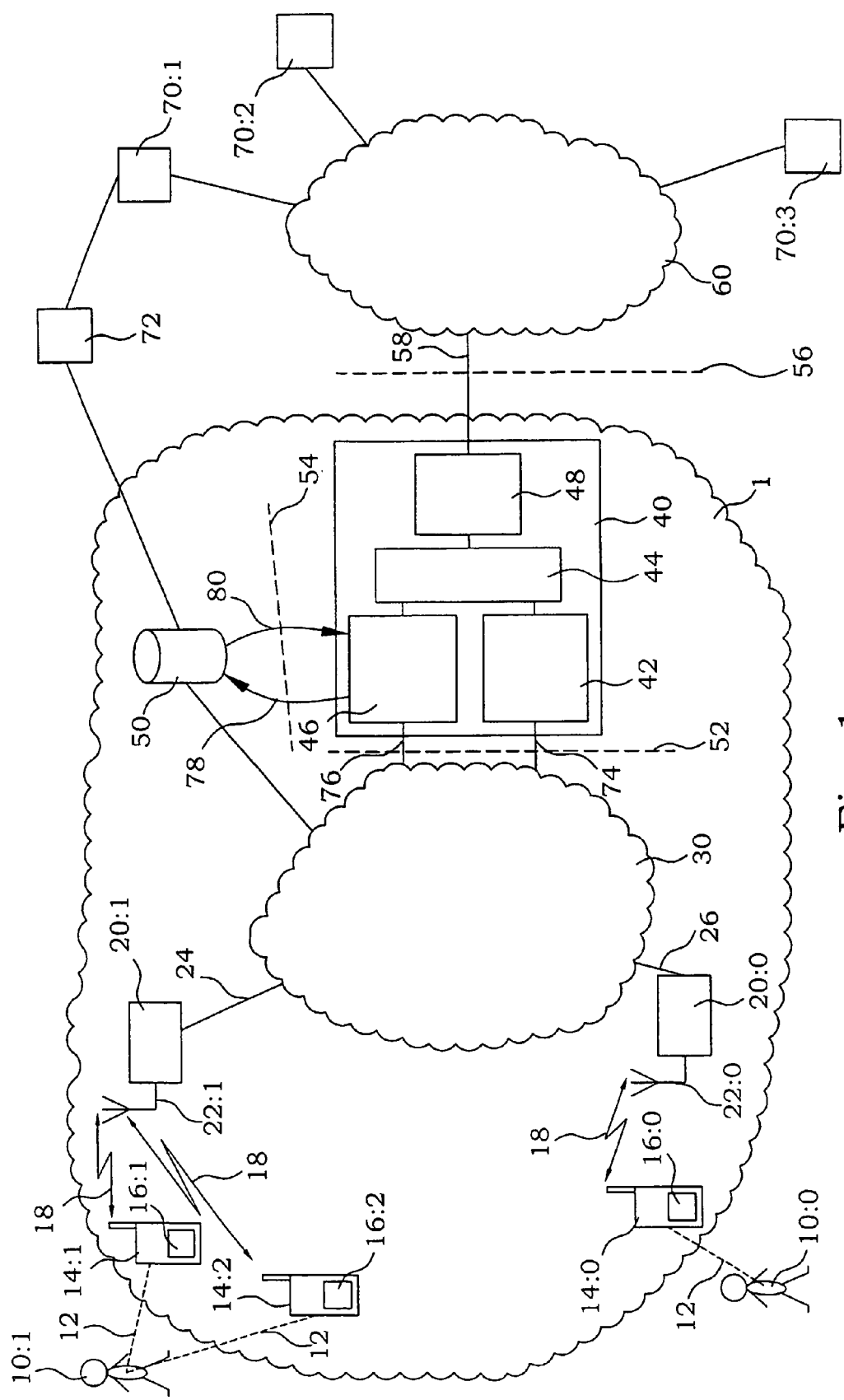
FIG. 1 is a schematic block diagram of a mobile communications system supporting SMS.

FIG. 1 illustrates such a mobile communications system 1. A number of users or mobile subscribers 10:0, 10:1 have access to one or more mobile terminals 14:0, 14:1, 14:2. Each subscriber 10:0, 10:1 is characterised by a unique identification number, MSISDN. There is typically a proprietary relation 12 between the subscribers 10:0, 10:1 and the mobile terminals 14:0, 14:1, 14:2 the subscriber uses. The mobile terminals 14:0, 14:1, 14:2 have also a unique identity, defined by the IMEISV. In order to associate the subscriber and the mobile terminal 14:0, 14:1, 14:2, a SIM card 16:0, 16:1, 16:2 is introduced in the mobile terminal 14:0, 14:1, 14:2. The position of the SIM card 16:0, 16:1, 16:2 constitutes the connection with the mobile terminal 14:0, 14:1, 14:2, while the connection between the SIM card 16:0, 16:1, 16:2 and the subscriber 10:0, 10:1 is made by an agreement registered in a database. The SIM card 16:0, 16:1, 16:2 does also have an identity, defined by the IMSI. As a summary, the subscriber is identified by the MSISDN, the SIM card by the IMSI and the mobile terminal by the IMEISV. Each mobile terminal 14:0, 14:1, 14:2 is connected by means of wireless communication links 18 to respective base station 22:0, 22:1. The base stations 22:0, 22:1 are typically arranged to serve several mobile terminals simultaneously. The base stations 22:0, 22:1 are connected to mobile switching centres 20:0, 20:1. The communications system 1 keeps track of to which mobile switching centre (MSC) 20:0, 20:1 each terminal 14:0, 14:1, 14:2 is connected, by updating address fields of a HLR 50.

When sending a normal SMS, a subscriber 10:0 may type a message at his originating mobile terminal 14:0 and request that the SMS should be sent to a certain terminating subscriber 10:1, identified by a MSISDN. The message and its associated MSISDN are transmitted over a connection 26 to the core network 30 of the communications system. In the present illustrated system, the SMS is transmitted in a single SS7 packet through the core network 30 to a SMS controller 40. The communication over the connection 74 between the core network 30 and the SMS controller is governed by an interface 52 defined by protocols of 3GPP standards, and comprises the message and the MSISDN data. The SMS message is received by a SMS interworking MSC 42 and the SMS is at least temporary stored in a controller storage 44.

A SMS gateway MSC 46 is connected to the controller storage 44 and interacts with the HLR 50 over an interface 54 to achieve address data associated with the intended terminating subscriber. The MSISDN is provided 78 to the HLR 50, which uses its databases to return 80 corresponding IMSI data and the address of the MSC presently serving the subscriber. The communication between the SMS controller 40 and the HLR 50 takes place in this embodiment according to a Mobile Application Part (MAP) standard of a 3GPP specification. The SMS gateway MSC 46 initiates a transmission of the SMS message with the associated IMSI to the MSC address over the connection 76 and the SS7 network 30. The IMSI is used by the MSC during paging of the mobile terminal. The addressed MSC 20:1 receives the message and the IMSI data over the connection 24 and forwards it to the mobile terminal 14:1, having the SIM card 16:1 associated with the IMSI data. In this manner, the intended terminating subscriber 10:1 is reached by the SMS.

One important part for being able to provide this service is the HLR 50. FIG. 2a schematically illustrates part of the content of an HLR in a typical SMS case. The HLR comprises a number of entries, illustrated as rows of data. Each entry comprises an MSISDN number 101, an IMSI number 102, a present MSC address 104 and in this embodiment also an IMEISV number 103. The entries thereby define the present relations between the hardware identification data, i.e. IMSI and IMEISV, and the MSISDN. Furthermore, the present location in the communications network is given by the MSC address. This HLR 50 is updated continuously. This means that if a subscriber places his SIM card in a new mobile terminal, the IMEISV number of the corresponding entry is updated for reflecting the new hardware.

Other applications have been developed, utilising the SMS concepts for transmitting data to the subscriber, terminal or SIM card. Non-exclusive examples are notification of e-mail, notification of multimedia message service (MMS) messages, voice mail, WAP push, SIM toolkit SMS or OTA configuration SMS. Such application nodes are illustrated by 70:1, 70:2, 70:3 in FIG. 1. The SMS messages generated by these applications 70:1, 70:2, 70:3 are provided, typically by an Internet network 60, to an application node interworking unit 48 of the SMS controller 40. Other types of networks or connections may also be used to connect the SMS controller 40 and the applications 70:1, 70:2, 70:3. The message, together with a MSISDN identifying the terminating subscriber is transmitted over a connection 58 using e.g. a Short Message Peer-to-Peer (SMPP). The SMS message is then forwarded in the same manner as for subscriber originated SMS messages.

There is, however, a principal difference between some application SMS messages and normal subscriber originated SMS messages. The subscriber originated SMS messages are in all real situations intended for the terminating subscriber. However, application SMS messages may instead be intended to reach the SIM card or the mobile terminal instead of the actual subscriber. If a subscriber moves the SIM card to a new terminal, an application that generates mobile terminal terminating SMS messages has to be informed. Furthermore, if MSISDN is moved, using e.g. Dual SIM procedures, from a SIM card to another SIM card, also SIM terminating SMS messages will miss the targeted SIM card. The concept of dual SIM may also be extended to more than two SIM cards.

The principles for an OTA configuration SMS can be described with reference to FIG. 1 using a particular implementation of ADD. When a subscriber with a new terminal is detected, a possible procedure can be as follows. The MSC node 20:1 in either the home public land mobile network (HPLMN) or the visited public land mobile network (VPLMN) fetches IMEISV for all users upon Location Update, type IMSI Attach or Normal. The MSC 20:1 sends the received IMEISV in the Update Location update operation to the HPLMN HLR node 50. The HLR 50 stores IMEISV together with other subscriber data, as described above. The HLR 50 sends a message to a terminal capability server 72. In the presently illustrated system, the terminal capability server 72 checks the received information against an internally stored configuration data file. The terminal capability server 72 sends a new configuration order to a DMS, illustrated as the application node 70:1. Any appropriate data can be attached. The DMS 70:1 processes the configuration orders on regular intervals and sends appropriate configuration parameters based on received device data and access point name (APN) to identified subscribers. The DMS 70:1 sends an OTA SMS, addressed with the MSISDN, to a SMS controller 40 for further delivery according to the procedures described further above. The terminal capability server 72, here provides the necessary identity information for being able to perform the OTA configuration.

A further complication arises when the concept of dual (or multiple) SIM is introduced. Many operators today have solutions with more than one SIM-card associated with the same MSISDN number. These solutions are often named Dual SIM, GSM Twin Cards or similar. With these solutions, a subscriber do not need to move the SIM card between the terminals if the subscriber has more than one terminal. Several terminals can simultaneously be used for mobile originating calls, but only one can be used for mobile terminated calls and mobile terminated SMS messages. A typical case is a user with both a hand-held terminal as well as a car-mounted terminal. Another typical case is a user with a large advanced smartphone and a small mobile telephone. It is then up to the subscriber to specify to the network which of these terminals that should be marked in HLR as currently active for mobile terminated calls and SMS messages.

FIG. 2b schematically illustrates parts of the content of a HLR in a typical Dual-SIM case. Each SIM card, i.e. each IMSI, corresponds to one entry of the HLR 50. However, since several IMSI's can be associated with the same MSISDN, only the IMSI selected for terminating incoming calls has a MSISDN number defined. In this particular example, the subscriber MSISDN-1 has Dual-SIM's with IMSI numbers IMSI-1 and IMSI-2. IMSI-1 is selected as the one that should receive incoming calls. Likewise, the subscriber MSISDN-3 has marked IMSI-4 as the "active" SIM card and has IMSI-3 "passive".

However, if an application node intends to send a SMS message to a certain SIM card or mobile terminal, the corresponding MSISDN can be associated with another IMSI or IMEISV. This results in that the application node can not guarantee that the SMS really reaches the intended hardware. For instance, with reference to FIG. 2b, if IMSI-2 is the intended target, the associated MSISDN, i.e. MSISDN-1, is not active and furthermore MSISDN-1 is instead actively associated with another IMSI, namely IMSI-1.

The information used in the described embodiments is mainly constituted by IMSI, IMEI or IMEISV and MSISDN. However, other types of identification data for mobile terminals, subscriber identity modules and mobile subscribers can be used in an equivalent manner.

Added parameters of the interface 56 protocol control the communication between the application node 70:1, 70:2, 70:3 and the SMS controller 40. These parameters comprise hardware identification data, typically at least one of subscriber identification module identification data (IMSI) and mobile equipment identification data (IMEI or IMEISV).

Figure 3:
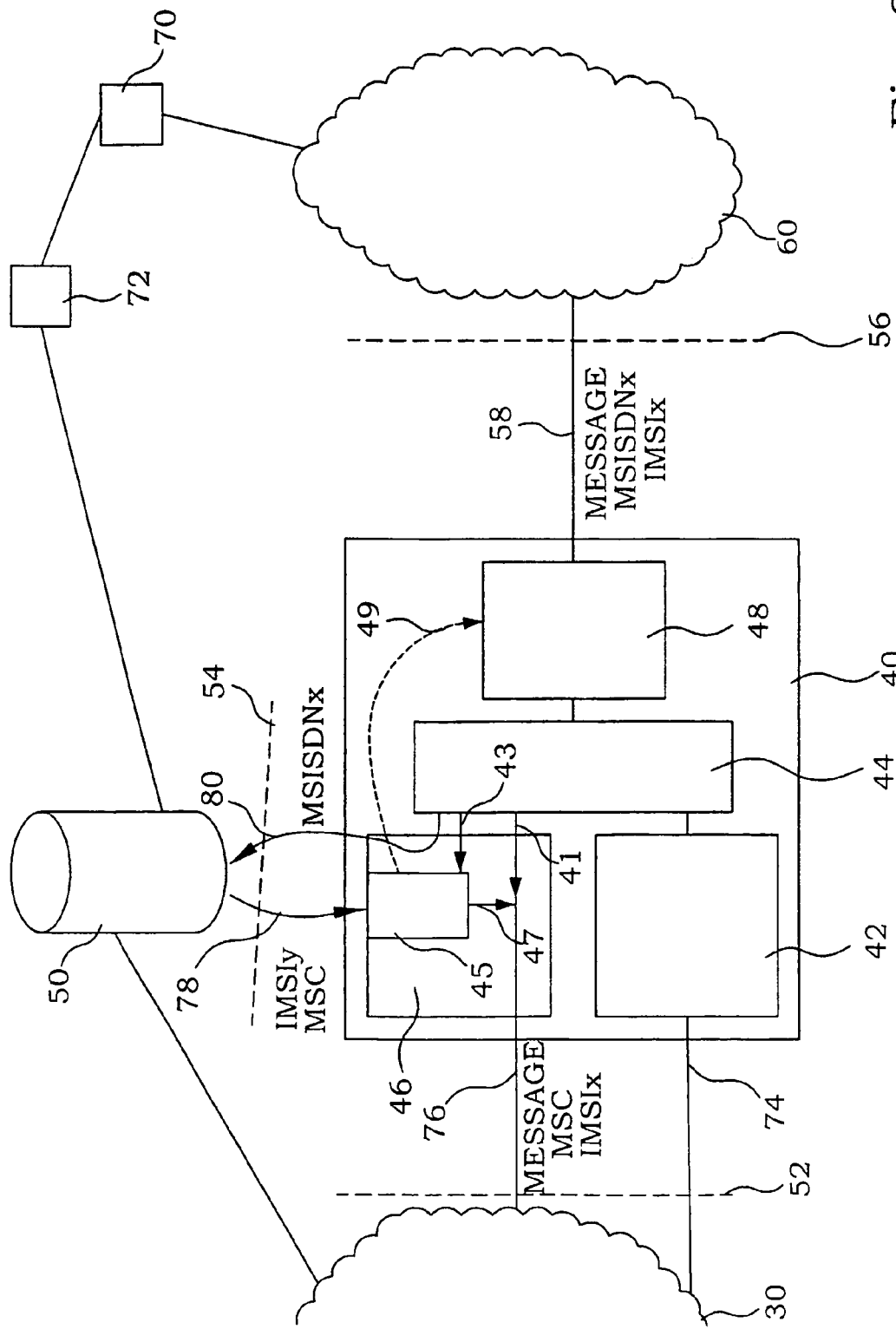
FIG. 3 is a schematic block diagram of an example embodiment of a message controller and its surrounding units.

FIG. 3 illustrates an embodiment of a SMS controller 40 together with parts of the surrounding communications system. An SMS message and an associated MSISDN number MSISDNx are sent from an application node 70 to the SMS controller over the connection 58. According to this embodiment, in addition to this data, also associated IMSI data IMSIx is attached. When the SMS GMSC 46 interrogates the HLR 50 with a message requesting routing information for the SMS, the MSISDNx data is used as identification. The returned IMSI data IMSIy (and also MSC address data) corresponds to the SIM card that is the "active" receiver of calls and SMS's according to the databases of the HLR 50. The SMS GMSC 46 compares in a comparator 45 the IMSIy data from the HLR 50 and the IMSIx data received by the connection 43 to verify that they are the same. If they indeed are the same, implicitly, the MSC address is also the MSC address associated with IMSIx and provided by the connection 47 to join the SMS message provided by 41. The SMS send procedure then continues as normal, by initiating a transmission of the SMS. The data provided on the connection 76 then comprises the SMS message, the MSC address and the IMSIx data.

If the IMSI received from the HLR 50 is not the same as the one received from the application node, alternative error handling procedures are possible. In one embodiment, an error message 49 is provided to the application node, telling that the intended terminating hardware can not be reached by use of the MSISDN number as only address. In an alternative embodiment, the SMS message could be stored for a while, and a new HLR interrogation can be made after a delay time, to check if there are any changes in choice of active SIM cards. Here, an error message could be returned e.g. after a certain number of trials or after a certain time.

In accordance with the embodiment of FIG. 3, with a simple update of the SMPP protocol, or other protocol controlling the communication between the application node and the SMS controller, i.e. the interface 56, the information from the HLR can be used to verify that the correct terminal or SIM card is addressed. No changes in the present standardised protocols for the interface 54 between the SMS controller 40 and the HLR 50 have to be performed.

Figure 4:
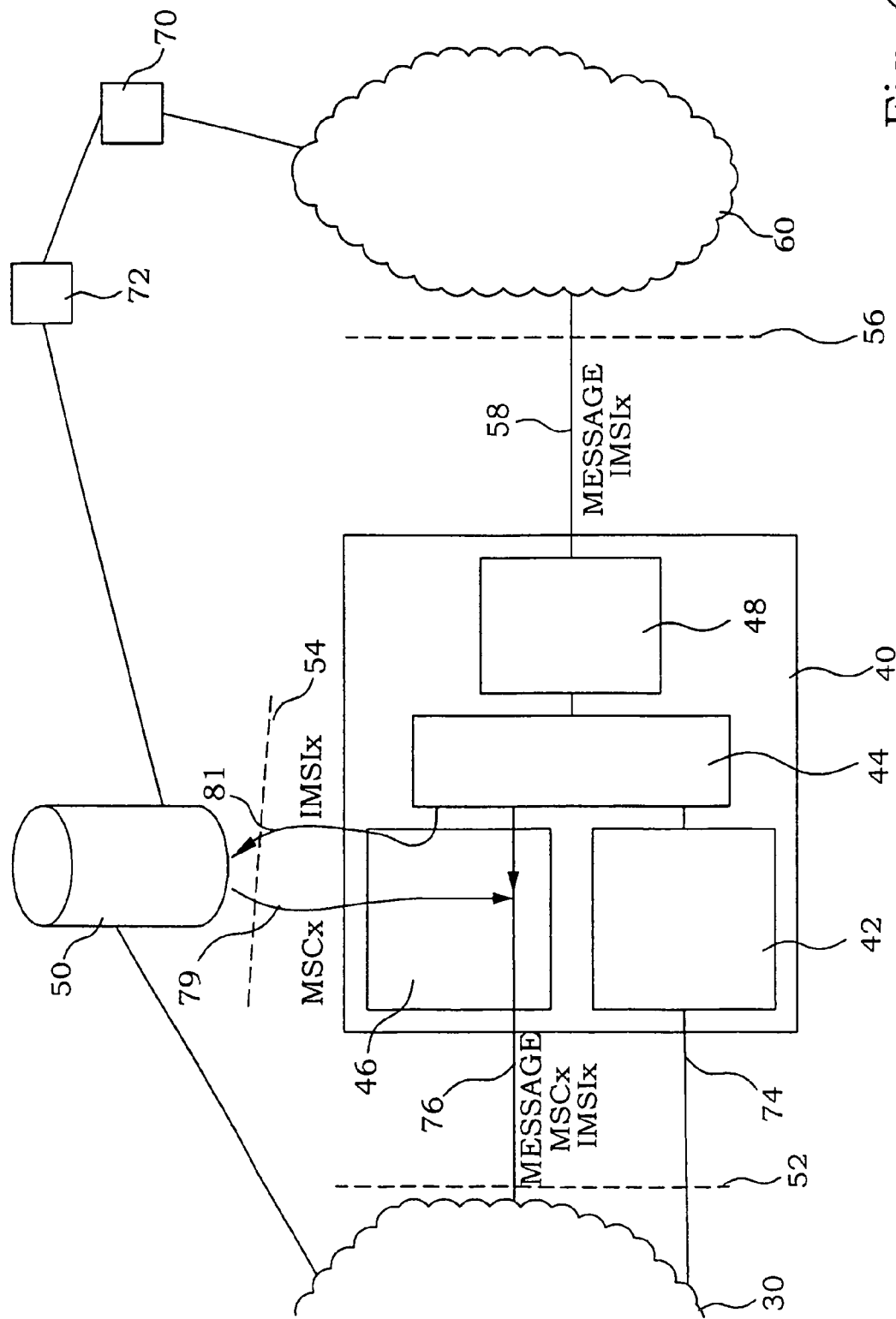
FIG. 4 is a schematic block diagram of example embodiments of a message controller and a HLR.

However, if further changes are performed also at the interface 54, further advantages can be reached. FIG. 4 illustrates another embodiment of a SMS controller. An SMS message is sent from an application node 70 to the SMS controller over the connection 58. The MSISDN number can also optionally be provided. According to this embodiment of the present invention, in addition to this data, also associated IMSI data IMSIx is attached. According to this embodiment, the SMS GMSC 46 interrogates the HLR 50 with a message according to a modified standard. Here routing information for the SMS is requested based on the IMSIx data 81 used as identification. In the return, MSC address data MSCx 79 corresponds to the SIM card having the identity of IMSIx is provided, regardless of if the SIM card is marked as active or not. This is provided according to information stored in the databases of the HLR 50. The SMS GMSC 46 adds the MSCx address to the message and IMSIx data. The SMS send procedure then continues as normal, by initiating a transmission of the SMS. The data provided on the connection 76 then comprises the SMS message, the MSCx address and the IMSIx data.

If the MAP interface 54 is updated to be able to transfer also IMSI as identifying information, the correct terminal can be addressed independent of which SIM card is marked as active for mobile terminated SMS in the case of Dual SIM solutions. In such a case, the need for error signalling is not as vital as in the embodiment of FIG. 4.

Figure 5:
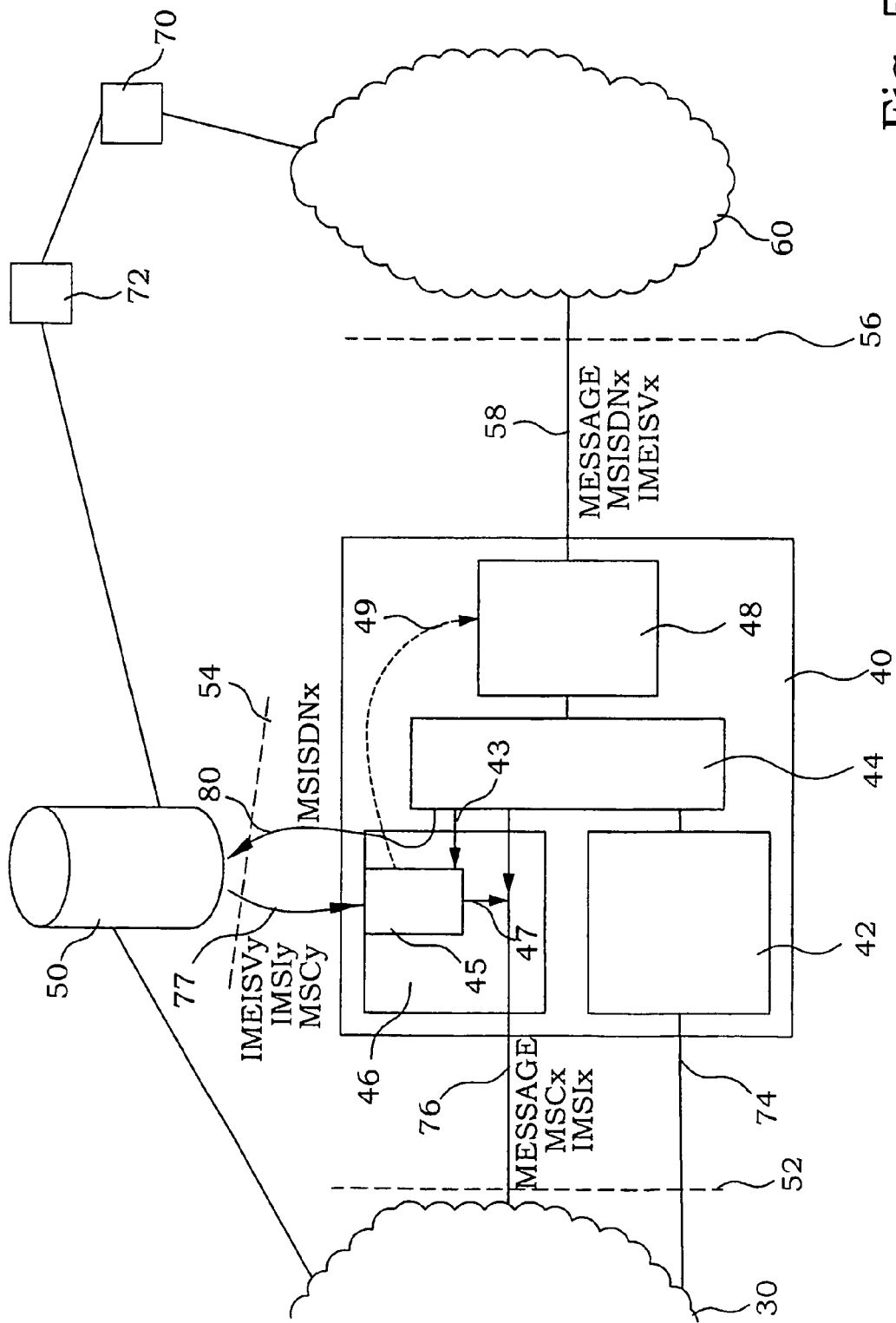
FIG. 5 is a schematic block diagram of other example embodiments of a message controller and a HLR.

FIG. 5 illustrates yet another embodiment of a SMS controller. A SMS message is sent from an application node 70 to the SMS controller over the connection 58, together with the MSISDN number MSISDNx. According to this embodiment, in addition to this data, also associated IMEI data IMEIx is attached. According to this embodiment, the SMS GMSC 46 interrogates the HLR 50 with a message comprising the MSISDNx 80. In the return, MSC address data MSCy 79 corresponds to the terminal being associated as active in relation to the MSISDNx. Also, the corresponding IMSIy and IMEIy are provided to the SMS GMSC 46. The SMS GMSC 46 compares in a comparator 45 the IMEIy data from the HLR 50 and the IMEIx data received by the connection 43 to verify that they are the same. If they indeed are the same, the MSC address MSCy is the same as MSCx, the IMSIy is the same as IMSIx, and are provided by the connection 47 to join the SMS message provided by 41. The SMS send procedure then continues as normal, by initiating a transmission of the SMS. The data provided on the connection 76 then comprises the SMS message, the MSCx address and the IMSIx data.

If the IMEI received from the HLR 50 is not the same as the one received from the application node, alternative error handling procedures are possible in analogy with the embodiment of FIG. 3. An error message 49 may be provided to the application node, telling that the intended terminating hardware, in this case a certain mobile terminal, can not be reached by use of the MSISDN number as only address. In an alternative embodiment, the SMS message could be stored for a while, an a new HLR interrogation can be made after a delay time, to check if there are any changes in choice of active terminal equipment. Here, an error message could be returned e.g. after a certain number of trials or after a certain time.

Note that in the embodiment of FIG. 5, the HLR 50 is assumed to include records of IMEISV (or IMEI) data. In earlier embodiments it does not matter whether or not the HLR 50 comprises IMEI or IMEISV records, since such data is not used.

In principle, also IMEI would be possible to use in a setup similar to the embodiment of FIG. 4. However, searching for a MSC address based solely on an IMEI number could be difficult to implement in reality.

In yet another embodiment, the data received by the SMS controller 40 over the interface 56 comprises both IMSI and IMEISV. The SMS GMSC 46 provides the IMSI to the HLR 50 over the interface 54, but receives IMEISV in return. The IMEISV is then used for comparing the originally intended terminating hardware with the one stored in the HLR 50. This could be used to ensure that the SIM card is situated in the correct phone. This could be a complement to the use of a terminal capability server 72.

In the present disclosure, SMS is used as an example message system. The technology described herein can, however, also be applied to other message systems, e.g. Unstructured Supplementary Service Data (USSD). Likewise, an SMS controller is used as a model of a general message controller. In the described embodiments, a location updated subscription database is exemplified by a HLR. However, other subscriber databases having updated location data, such as e.g. Home Subscriber Servers (HSS), can also be utilised. The address received from the location updated subscription database refers to a switching or support node, which in the described embodiment is exemplified by a MSC. However, other types of switching or support nodes, such as a SGSN in GPRS or 3G systems can also be addressed.

Furthermore, in the embodiments above IMEISV has been used for referring to the hardware identity of the mobile terminal. Since IMEISV comprises the IMEI and an extension defining the actual software version, any messages addressed to the mobile terminal that are independent on the software version can equally well be addressed by only the IMEI. In other words, both IMEI and IMEISV may serve as references to the mobile terminal hardware.

Figure 6:
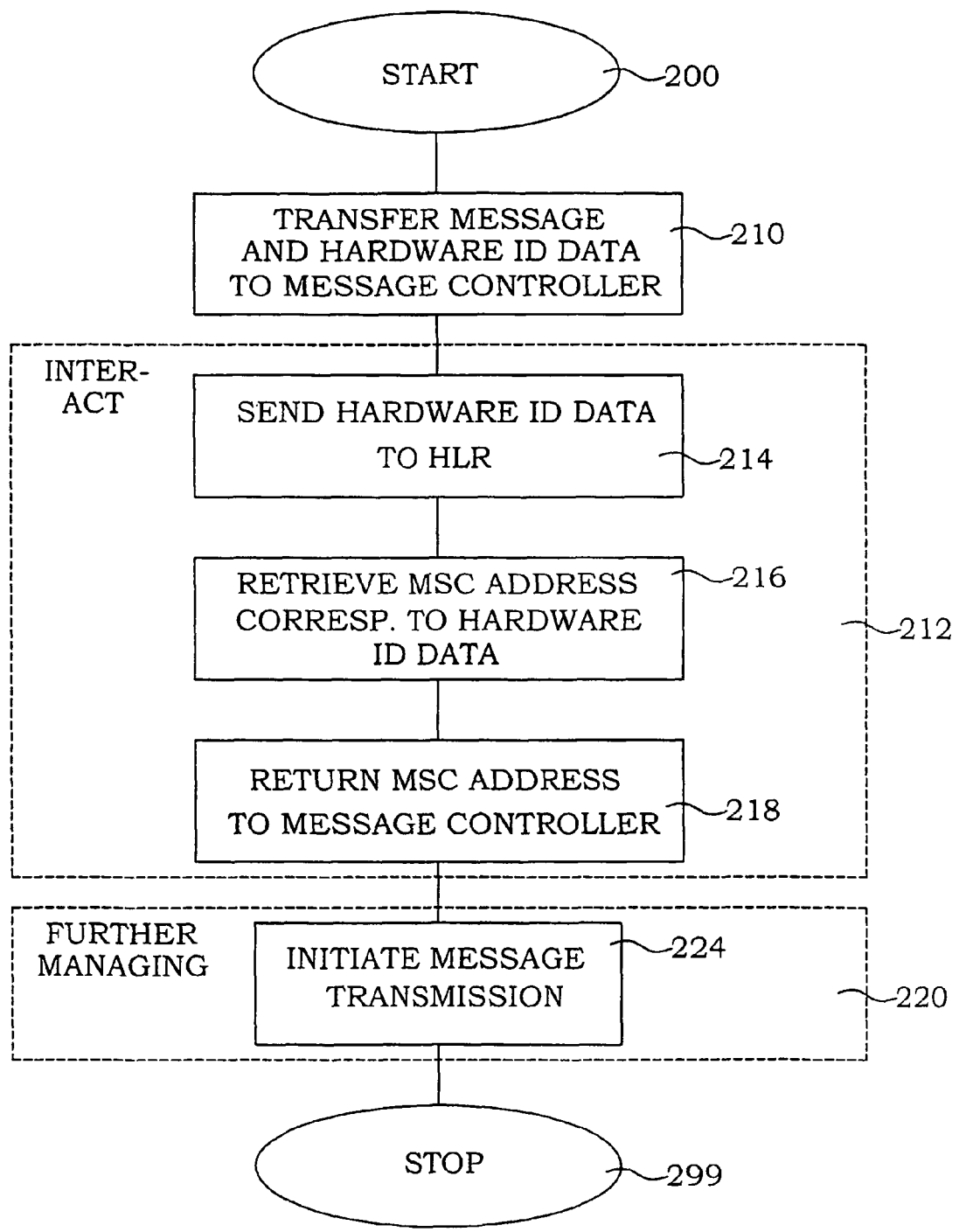
FIG. 6 is a flow diagram of the main steps of an example embodiment of a method.

FIG. 6 illustrates a flow diagram of the main steps of an embodiment of a method. The procedure starts in step 200. In step 210, a message and hardware identification data is transferred from an application node to a message controller. An interaction step 212 between the message controller and a location updated terminal database, typically an HLR, comprises in the present embodiment three part steps 214, 216 and 218. In step 214, the hardware identification data is sent to the HLR as a part of an interrogation for a switching or supporting node address. In step 216, the HLR retrieves the address that corresponds to the hardware identification data, and in step 218, this address data is returned to the message controller. A step 220 of further managing of the message comprises in this embodiment the step 224 of initiating of the transmission of the message according to the address received from the HLR. The procedure ends in step 299.

FIG. 7 illustrates a flow diagram of the main steps of another embodiment of a method. The procedure starts in step 200. In step 210, a message and (first) hardware identification data is transferred from an application node to a message controller. The terminating subscriber identification number is transferred in step 211, together with the message or separately. An interaction step 212 between the message controller and a location updated terminal database, typically an HLR, comprises in the present embodiment three part steps 213, 215 and 217. In step 213, the subscriber identification number is sent to the HLR as a part of an interrogation for a switching or supporting node address. In step 215, the HLR retrieves the address that corresponds to the subscriber identification number and also a corresponding (second) hardware identification data. In step 217, this address data and hardware identification data is returned to the message controller. A step 220 of further managing of the message comprises in this embodiment the part steps 221 to 224. In step 221, the hardware identification data received from the HLR and the application node, respectively, are compared. If the hardware identification data, as decided in step 222 are correspondent data, the procedure continues to step 224, where initiating of the transmission of the message according to the address received from the HLR takes place. If it in step 222 is concluded that the hardware data does not agree, the procedure continues to step 223, where an error handling procedure is performed. The procedure ends in step 299.

The embodiments described above are to be understood as a few illustrative examples. It will be understood by those skilled in the art that various modifications, combinations and changes may be made to the embodiments without departing from the scope of the appended claims. In particular, different part solutions in the different embodiments can be combined in other configurations, where technically possible. The scope of the present invention is, however, defined by the appended claims.

The invention claimed is:

1. A method of handling messages in a mobile communications system, said messages being single packet messages managed via a dedicated message controller available through a core network of said mobile communication system, said method comprising the steps of:

transferring one of said messages together with first hardware identification data being one of an international mobile subscriber identity (IMSI), an international mobile equipment identity (IMEI), and an international mobile equipment identity extended with software version (IMEISV) that uniquely identifies an intended terminating receiver of said one message from an application node having an application configured for generating said one message for transmitting data to a terminal or SIM card identified by said first hardware identification data, to an application node interworking unit of said dedicated message controller;

interacting between the dedicated message controller and a location updated subscriber database; and further managing of the message based on said one of an international mobile subscriber identity (IMSI), international mobile equipment identity (IMEI) and international mobile equipment identity extended with software version (IMEISV) that uniquely identifies an intended terminating receiver of said one message and data stored in the location updated subscriber database;

wherein the step of interacting comprises the steps of:

sending said one of an international mobile subscriber identity (IMSI), international mobile equipment identity (IMEI) and international mobile equipment identity extended with software version (IMEISV) that uniquely identifies an intended terminating receiver of said one message from the message controller to the location updated subscriber database;

where said one of an international mobile subscriber identity (IMSI), international mobile equipment identity (IMEI) and international mobile equipment identity extended with software version (IMEISV) that uniquely identifies an intended terminating receiver of said one message is used in the location updated subscriber database to retrieve an address, if any, of a switching or support node presently handling hardware defined by the hardware identification data; and returning the address of the switching or support node, if any, from the location updated subscriber database to the dedicated message controller;

wherein the step of further managing comprises initiating of a transmission of said one message to the address of the switching or support node; and wherein the step of further managing further comprises, if no address of a switching or support node presently handling hardware defined by the hardware identification data is retrieved in the location updated subscriber database, storing of said one message and resuming the interacting step with the location updated subscriber database after a delay time.

2. A method according to claim 1, comprising the further step of:

comparing said one of an international mobile subscriber identity (IMSI), international mobile equipment identity (IMEI) and international mobile equipment identity extended with software version (IMEISV) that uniquely identifies an intended terminating receiver of said one message and hardware identification data stored in the location updated subscriber database, whereby the step of further managing being based on the outcome of the step of comparing.

3. A method of handling messages in a mobile communications system, said messages being single packet messages managed via a dedicated message controller available through a core network of said mobile communication system, said method comprising the steps of:

transferring one of said messages together with first hardware identification data being one of international mobile subscriber identity (IMSI), international mobile equipment identity (IMEI) and international mobile equipment identity extended with software version (IMEISV) that uniquely identifies an intended terminating receiver of said one message from an application node having an application configured for generating said one message for transmitting data to a terminal or SIM card identified by said first hardware identification data, to an application node interworking unit of said dedicated message controller;

interacting between the dedicated message controller and a location updated subscriber database;

further managing of the message based on said one of an international mobile subscriber identity (IMSI), international mobile equipment identity (IMEI) and international mobile equipment identity extended with software version (IMEISV) that uniquely identifies an intended terminating receiver of said one message and data stored in the location updated subscriber database;

transferring mobile subscriber identification data associated with said one message from the application node to the dedicated message controller;

wherein the step of interacting in turn comprises the steps of:

sending the mobile subscriber identification data from the dedicated message controller to the location updated subscriber database;

retrieving an address, if any, of a switching or support node presently handling a mobile subscriber defined by the mobile subscriber identification data and second hardware identification data uniquely identifying hardware equipment that, according to the location updated subscriber database, is associated with the mobile subscriber;

returning the address of the switching or support node and the second hardware identification data from the location updated subscriber database to the dedicated message controller; and comparing said one of an international mobile subscriber identity (IMSI), international mobile equipment identity (IMEI) and international mobile equipment identity extended with software version (IMEISV) that uniquely identifies an intended terminating receiver of said one message and the second hardware identification data;

wherein the step of further managing comprises, if said one of an international mobile subscriber identity (IMSI), international mobile equipment identity (IMEI) and international mobile equipment identity extended with software version (IMEISV) that uniquely identifies an intended terminating receiver of said one message the second hardware identification data are equivalent, an initiating of a transmission of said one message to the address of the switching or support node, wherein the step of further managing further comprises, if said one of an international mobile subscriber identity (IMSI), international mobile equipment identity (IMEI) and international mobile equipment identity extended with software version (IMEISV) that uniquely identifies an intended terminating receiver of said one message the second hardware identification data are non-equivalent, storing of said one message and resuming the interacting step with the location updated subscriber database after a delay time.

4. A method according to claim 3, wherein the step of further managing further comprises, if said one of an international mobile subscriber identity (IMSI), international mobile equipment identity (IMEI) and international mobile equipment identity extended with software version (IMEISV) that uniquely identifies an intended terminating receiver of said one message the second hardware identification data are non-equivalent, sending of an error message to the application node.

5. A method according to claim 1, wherein the second hardware identification data comprises at least one of subscriber identification module identification data and mobile equipment identification data.

6. A method according to claim 5, comprising the further step of returning at least one of subscriber identification module identification data and mobile equipment identification data from the location updated subscriber database to the message controller.

7. A method according to claim 1, wherein said one message is a short message service—SMS—message and the dedicated message controller is a SMS controller.

8. A method according to claim 1, wherein the location updated subscriber database is home location register.

9. A method according to claim 1, wherein the switching or support node is a mobile switching center.

10. A message controller of a mobile communications system, comprising:
 electronic circuitry configured to manage single packet messages via a core network of said mobile communication system;
 an application node interworking unit configured to receive one of said messages together with first hardware identification data being one of an international mobile subscriber identity (IMSI), an international mobile equipment identity (IMEI), and an international mobile equipment identity extended with software version (IMEISV) that uniquely identifies an intended terminating receiver of the one message from an application node having an application configured to generate the one message for transmitting data to a terminal or SIM card identified by said first hardware identification data; and
 electronic circuitry configured to interact with a location updated subscriber database and further manage the message based on said one of an international mobile subscriber identity (IMSI), international mobile equipment identity (IMEI) and international mobile equipment identity extended with software version (IMEISV) that uniquely identifies an intended terminating receiver of said one message and data stored in the location updated subscriber database;
 wherein the electronic circuitry includes:
  a transmitter for sending said one of an international mobile subscriber identity (IMSI), international mobile equipment identity (IMEI) and international mobile equipment identity extended with software version (IMEISV) that uniquely identifies an intended terminating receiver of said one message to the location updated subscriber database;
  a second receiver for an address, if any, of a switching or support node presently handling hardware defined by said one of an international mobile subscriber identity (IMSI), international mobile equipment identity (IMEI) and international mobile equipment identity extended with software version (IMEISV) that uniquely identifies an intended terminating receiver of said one message from the location updated subscriber database;
 wherein the electronic circuitry is configured to initiate a transmission of one message to the address of the switching or support node; and
 wherein the electronic circuitry is configured, if no address of a switching or support node presently handling hardware defined by said one of an international mobile subscriber identity (IMSI), international mobile equipment identity (IMEI) and international mobile equipment identity extended with software version (IMEISV) that uniquely identifies an intended terminating receiver of said one message is provided by the location updated subscriber database, to store said one message and resume the interacting with the location updated subscriber database after a delay time.

11. A message controller according to claim 10, wherein the electronic circuitry is configured to manage said one message based on the outcome of a comparison between said one of an international mobile subscriber identity (IMSI), international mobile equipment identity (IMEI) and international mobile equipment identity extended with software version (IMEISV) that uniquely identifies an intended terminating receiver of said one message and hardware identification data stored in the location updated subscriber database.

12. A message controller of a mobile communications system, comprising:
 electronic circuitry configured to manage single packet messages via a core network of said mobile communication system;
 an application node interworking unit configured to receive one of said messages together with first hardware identification data being one of international mobile subscriber identity (IMSI), international mobile equipment identity (IMEI) and international mobile equipment identity extended with software version (IMEISV) that uniquely identifies an intended terminating receiver of the one message from an application node having an application configured for generating the one message for transmitting data to a terminal or SIM card identified by said first hardware identification data; and
 electronic circuitry configured to interact with a location updated subscriber database and further manage the message based on said one of an international mobile subscriber identity (IMSI), international mobile equipment identity (IMEI) and international mobile equipment identity extended with software version (IMEISV) that uniquely identifies an intended terminating receiver of said one message and data stored in the location updated subscriber database;
 wherein the first receiver is configured for further receiving mobile subscriber identification data;
 wherein the electronic circuitry comprises:
  a transmitter for sending said one of an international mobile subscriber identity (IMSI), international mobile equipment identity (IMEI) and international mobile equipment identity extended with software version (IMEISV) that uniquely identifies an intended terminating receiver of said one message to the location updated subscriber database; and
  a second receiver for an address, if any, of a switching or support node presently handling a mobile subscriber defined by the mobile subscriber identification data and second hardware identification data uniquely identifying hardware equipment that, according to the location updated subscriber database, is associated with the mobile subscriber from the location updated subscriber database;
 wherein the electronic circuitry is configured to
  compare said one of an international mobile subscriber identity (IMSI), international mobile equipment identity (IMEI) and international mobile equipment identity extended with software version (IMEISV) that uniquely identifies an intended terminating receiver of said one message the second hardware identification data;
  initiate a transmission of said one message to the address of the switching or support node if the output of the comparison indicates that the first and second hardware identification data are equivalent;

wherein the electronic circuitry is configured to store said one message and resume interaction with the location updated subscriber database after a delay time if the output of the comparison indicates that said one of an international mobile subscriber identity (IMSI), international mobile equipment identity (IMEI) and international mobile equipment identity extended with software version (IMEISV) that uniquely identifies an intended terminating receiver of said one message the second hardware identification data are non-equivalent.

13. A message controller according to claim 12, wherein the electronic circuitry is configured to send an error message to an originating node of said one message if the output of the comparison indicates that said one of an international mobile subscriber identity (IMSI), international mobile equipment identity (IMEI) and international mobile equipment identity extended with software version (IMEISV) that uniquely identifies an intended terminating receiver of said one message the second hardware identification data are non-equivalent.

14. A message controller according to claim 10, wherein the second hardware identification data comprises at least one of subscriber identification module identification data and mobile equipment identification data.

15. A message controller according to claim 14, wherein the second receiver is configured to receive at least one of subscriber identification module identification data and mobile equipment identification data from the location updated subscriber database.

16. A message controller according to claim 10, wherein said one message is a short message service—SMS—message and the message controller is a SMS controller.

* * * * *